United States Patent
Chen et al.

(10) Patent No.: US 9,232,268 B2
(45) Date of Patent: Jan. 5, 2016

(54) UNIFIED VIDEO DELIVERY SYSTEM FOR SUPPORTING IP VIDEO STREAMING SERVICE

(75) Inventors: Xuemin Chen, Rancho Santa Fe, CA (US); Stephane Rodgers, San Diego, CA (US); Rajesh Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 455 days.

(21) Appl. No.: 13/170,764

(22) Filed: Jun. 28, 2011

(65) Prior Publication Data

US 2012/0216038 A1    Aug. 23, 2012

Related U.S. Application Data

(60) Provisional application No. 61/445,995, filed on Feb. 23, 2011.

(51) Int. Cl.

| | |
|---|---|
| *H04N 21/4402* | (2011.01) |
| *H04L 29/06* | (2006.01) |
| *H04L 9/08* | (2006.01) |
| *H04L 9/14* | (2006.01) |
| *H04N 21/266* | (2011.01) |
| *H04N 21/436* | (2011.01) |
| *H04N 21/4408* | (2011.01) |
| *H04N 21/442* | (2011.01) |
| *H04N 21/462* | (2011.01) |
| *H04N 21/4623* | (2011.01) |
| *H04N 21/6334* | (2011.01) |

(Continued)

(52) U.S. Cl.
CPC ............ *H04N 21/4402* (2013.01); *H04L 9/083* (2013.01); *H04L 9/14* (2013.01); *H04L 63/0428* (2013.01); *H04L 63/062* (2013.01); *H04N 21/26613* (2013.01); *H04N 21/43615* (2013.01); *H04N 21/4408* (2013.01); *H04N 21/44231* (2013.01); *H04N 21/4621* (2013.01); *H04N 21/4623* (2013.01); *H04N 21/63345* (2013.01); *H04N 21/64322* (2013.01); *H04N 21/8456* (2013.01); *H04L 2209/60* (2013.01)

(58) Field of Classification Search
CPC ............ H04L 2209/34; H04L 2209/60; H04L 63/0428; H04L 63/062; H04L 9/083; H04N 21/4402; H04N 21/4408
See application file for complete search history.

(56) References Cited

U.S. PATENT DOCUMENTS

| | | | |
|---|---|---|---|
| 6,421,733 B1 * | 7/2002 | Tso et al. ...................... | 709/246 |
| 6,871,193 B1 * | 3/2005 | Campbell et al. ............... | 705/67 |

(Continued)

*Primary Examiner* — Robert Leung
(74) *Attorney, Agent, or Firm* — Sterne, Kessler, Goldstein & Fox P.L.L.C.

(57) ABSTRACT

A home gateway may be used to handle at least a portion of processing of content obtained for consumption by client devices serviced via the home gateway. The home gateway may receive a single copy of content having a first format, and may convert the received content to one or more other formats suitable for presentation by at least one of the client devices based on knowledge of the client devices. The home gateway may maintain secure and/or protected access of the content handled via the home gateway. During protected access the home gateway may partition the content into a plurality of encrypted segments that are forwarded separately to the client devices. The client devices may utilize a corresponding plurality of encryption keys for decrypting the encrypted segments. The encryption keys may be obtained from an external key server. The home gateway may also generate the encryption keys.

19 Claims, 5 Drawing Sheets

(51) Int. Cl.
*H04N 21/643* (2011.01)
*H04N 21/845* (2011.01)

(56) References Cited

U.S. PATENT DOCUMENTS

| | | |
|---|---|---|
| 2001/0047517 A1* | 11/2001 | Christopoulos et al. ........ 725/87 |
| 2002/0143972 A1* | 10/2002 | Christopoulos et al. ...... 709/231 |
| 2003/0142826 A1* | 7/2003 | Asano ........................... 380/277 |
| 2005/0132264 A1* | 6/2005 | Joshi et al. .................. 715/500.1 |
| 2006/0005040 A1* | 1/2006 | Roberts ......................... 713/185 |
| 2007/0028099 A1* | 2/2007 | Entin et al. .................... 713/163 |
| 2008/0168568 A1* | 7/2008 | Brodersen et al. ............. 726/30 |
| 2008/0267409 A1* | 10/2008 | Raike ............................ 380/278 |
| 2011/0032856 A1* | 2/2011 | Ozawa ........................... 370/310 |

* cited by examiner

UNIFIED VIDEO DELIVERY SYSTEM FOR SUPPORTING IP VIDEO STREAMING SERVICE

CLAIM OF PRIORITY

This patent application makes reference to, claims priority to and claims benefit from U.S. Provisional Application Ser. No. 61/445,995 which was filed on Feb. 23, 2011.

The above stated application is hereby incorporated herein by reference in its entirety.

CROSS-REFERENCE TO RELATED APPLICATIONS/INCORPORATION BY REFERENCE

This application also makes reference to: U.S. application Ser. No. 13/171,148 filed on Jun. 28, 2011.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for unified video delivery system for supporting IP video streaming service.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for unified video delivery system for supporting IP video streaming service, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for unified video delivery system for supporting IP video streaming service. In various embodiments of the invention, a home gateway may be utilized to service a home network. In this regard, the home gateway may communicate with a plurality of client devices in the home network work. The home gateway may be utilized to obtain content for consumption and/or presentation by the client devices. The content may be delivered using legacy delivery mechanisms, such as cable and/or satellite, and/or may be delivered over broadband connections, using Internet Protocol (IP) streams. The home gateway may handle at least a portion of processing of content obtained for consumption by the client devices. In this regard, the home gateway may receive a single copy of content, having a first format, and may convert the received content to one or more other formats suitable for presentation by at least one of the client devices based on knowledge of the client devices, during IP content streaming, for example.

The home gateway may maintain during handling of content processing, secure and/or protected access of the content. In this regard, during protected access, after formatting delivered content for use by particular client device(s), the home gateway may partition the content into a plurality of segments, each of which may be encrypted separately using a unique key. The encrypted segments may then be forwarded to the client devices. During decryption operations in the client devices, the client devices may utilize the encryption keys associated with the encrypted segments. The encryption keys may be obtained, by both the client devices and the home gateway, from an external provider key server. Alternatively, the home gateway may generate the encryption keys. In this regard, the home gateway may generate the encryption keys based on control information provided by the key server.

When handling content requests, the home gateway may determine content consumption related information associated with the requesting client device. The content consumption related information may be determined dynamically and/or based on a client device database maintained by the home gateway. The content consumption related information may comprise information pertaining to device type, device capabilities and/or features available therein, and/or content presentation related functions in the client device. The content consumption related information may be utilized to configure operations or functions of the home gateway and/or the requesting client device.

Figure 1:
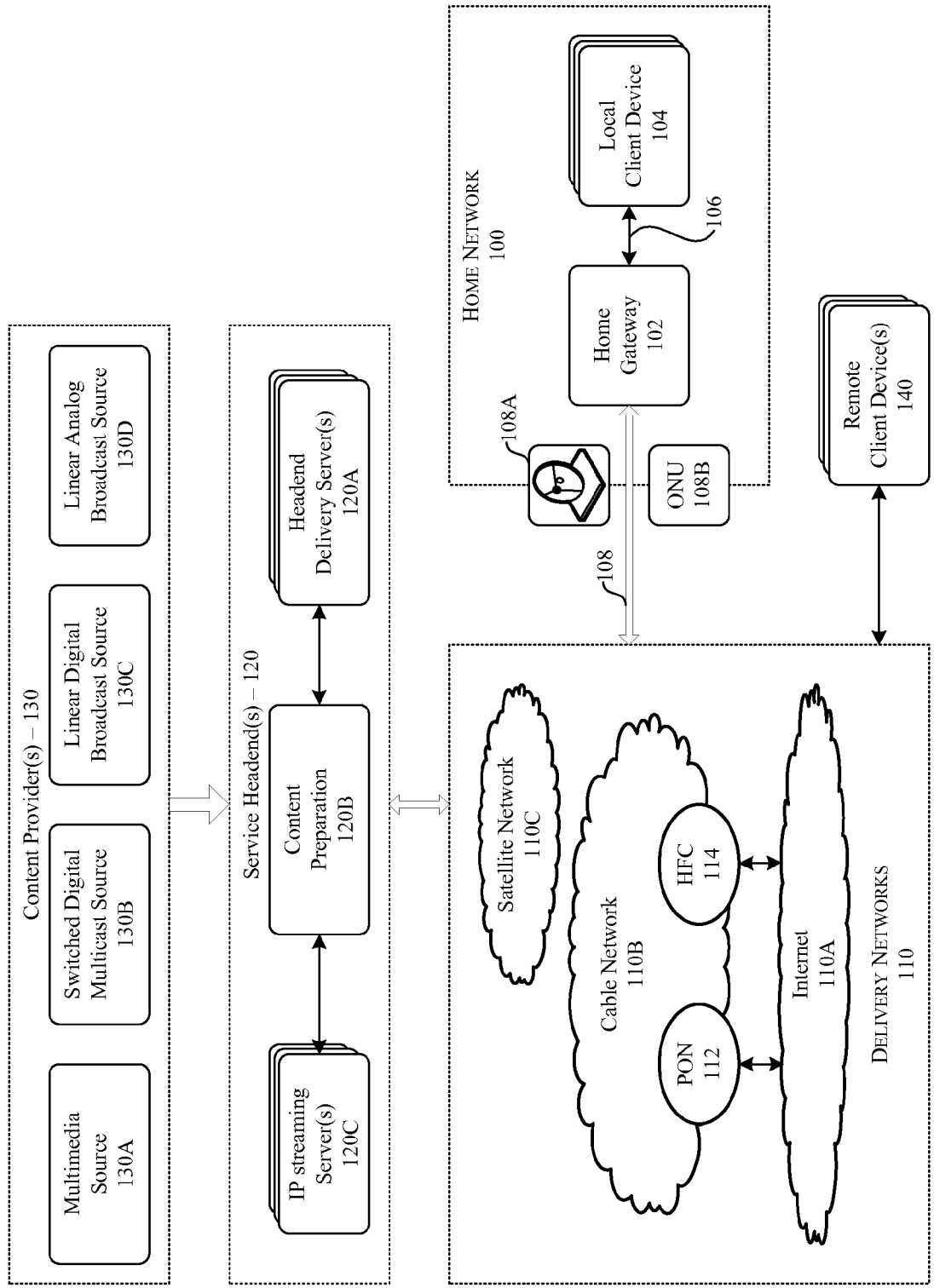
FIG. 1 is a block diagram illustrating an exemplary communication system that comprises a home network serviced by a home gateway, which may be utilized in accordance with an embodiment of the invention.

FIG. 1 is a block diagram illustrating an exemplary communication system that comprises a home network serviced by a home gateway, which may be utilized in accordance with an embodiment of the invention. Referring to FIG. 1, there is shown a home network 100, a plurality of delivery networks 110, one or more service headends 120, and one or more content providers 130. The home network 100 may be serviced by a home gateway 102. Furthermore, the home network 100 may comprise one or more local client device 104.

The service headends 120 may comprise various entities which may provide, using different access technologies or protocols, various services to home gateways 102 and/or to devices serviced thereby. The services may include, but are not limited to, network access, multimedia, television, Internet, phone, Ethernet, multimedia over coax alliance (MoCA), and/or passive optical network (PON) access for example. In this regard, at least some of the service headends 120 may comprise network access service providers, providing physical layer connections to the home gateway 102. Such physical layer connections may then be utilized to access content provided by the content providers 130, access services provided by other ones of the service headends 120, and/or access to intranets or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary aspect of the invention, the home gateway 102 may be operable to connect to multiple service headends 120 to facilitate receiving content originating from one or more of the content providers 130.

The service headend 120 may comprise one or more components for supporting and/or performing operations of the service headend 120. In this regard, the service headend 120 may comprise one or more headend delivery servers 120A, one or more content preparation servers 120B, and/or one or more IP streaming servers 120C. The headend delivery server 120A may comprise suitable logic, circuitry, interfaces, and/or code that may be operable to perform various processing and/or interfacing functions pertaining to one or more communication infrastructures, such as cable or satellite based infrastructures, which may be utilized to communicate, deliver and/or distribute content. Exemplary functions may comprise session resource management, conditional access management, packet processing, transport processing, and/or transmission or reception related operations, such as signal modulation and/or physical layer signal generation or reception.

The content preparation server 120B may comprise suitable logic, circuitry, interfaces, and/or code that may be operable to prepare content delivered via the service headend 120. In this regard, the content preparation server 120B may be utilized to process and/or handle content received from the content providers 120, and to configure and/or format the content for delivery based on the type of delivery infrastructure being utilized.

The IP streaming server 120C may comprise suitable logic, circuitry, interfaces, and/or code that may be operable to perform various functions pertaining to supporting IP streaming by the service headend 120. Exemplary functions may comprise web server (e.g. HTTP server) related functions, and content protection functions, such as encryption key generation and management server, which may enable protecting streamed content.

The content providers 130 may generate, capture, and/or package content that may be distributed to end-users, via the service headends 120 and/or the delivery networks 110. In this regard, content may comprise audio, video, multimedia, e-book, gaming, and/or other content. The delivered content may comprise commercial content, such as content generated by film or television production and/or distribution companies (e.g. Paramount Pictures or Warner Bros.), and/or personal content, such as user-generated content. The content may be, for example, downloadable and/or streaming, rented and/or purchased. Content originating from the content providers 130 may be distributed to the end-users (e.g. consumers) by the service headends 120.

The content providers 130 may comprise various content sources corresponding to various content distribution schemes. In this regard, exemplary content distribution sources may comprise multimedia content sources 130A, linear analog broadcast sources 130B, linear digital broadcast sources 130C, and/or switched digital multicast sources 130D. The multimedia content sources 130A may typically be utilized for providing content distributed by means of IP streaming. The linear analog broadcast sources 130B, linear digital broadcast sources 130C, and/or switched digital multicast sources 130D may typically be utilized in conjunction with content distribution via traditional broadcast and/or delivery infrastructures, such as via terrestrial, cable, and/or satellite based systems.

Content providers 130 and service headends 120 may be separate entities. In some instances, however, a single provider may provide both content and services. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the home gateways 102 via one or more physical connections provided by a network access service provider.

The delivery networks 110 may comprise one or more networks that may enable wireless and/or wired communication among a plurality of local and/or remote entities, based on one or more networking and/or communication infrastructures. In this regard, the delivery networks 110 may enable distribution of multimedia content from the content providers 130, directly and/or via the service headends 120, to end-users. The network connectivity available via the delivery networks 110 may be based on one or more communication standards and/or protocols. The delivery networks 110 may comprise, for example, Internet 110A, cable network 110B, and/or satellite network 110C.

The Internet 110A may comprise a system of interconnected networks to enable exchange of data between a plurality of nodes, based on one or more networking standards, including, for example, the Internet protocol (IP). For example, the Internet 110A may enable connectivity among a plurality of private and public, academic, business, and/or government nodes and/or networks. The physical connectivity may be provided in the Internet 110A via, for example, the Public Switched Telephone Network (PSTN), copper wires, fiber-optic cables, wireless interfaces, and/or other protocols and/or standards-based interfaces. The transport functionality may be performed in the Internet 110A based on, for example, one or more protocols, such as the TCP/IP protocol for example.

The cable network 110B may comprise suitable distribution nodes, systems, and/or subnetworks that may enable forwarding of communication between cable providers and a plurality of consumers. In this regard, the cable network 110B may comprise a network of fiber optics and/or coaxial cables for use in cable broadcasts. For example, in addition to traditional coaxial based networks, the cable network 110B may comprise one or more passive optical networks (PON) 112 and/or one or more hybrid fiber-coax (HFC) networks 114. Receiving optical signals, delivered via the PON 112 and/or the HFC 114, may require use of dedicated devices at the home network 100, such as optical network unit (ONU) 108B. The ONU 108B may comprise suitable logic, circuitry, interfaces, and/or code that may be operable to terminate fiber connections, to facilitate receiving of incoming optical signals, and transform them into electrical signals that may be further processed within the home network 100, such as via the home gateway 102. This may enable home gateway 102 to extract multimedia content carried by the optical signals.

The satellite network 110C may comprise suitable distribution nodes, systems, and/or subnetworks that may enable communication of satellite broadcasts by satellite providers to a plurality of consumers. For example, the satellite network 110C may comprise a plurality of orbiting satellite nodes and/or one or more terrestrial centers in a satellite broadcast system. Receiving satellite signals may require use of dedicate devices, such as satellite receiver 108A. The satellite receiver 108A may comprise suitable logic, circuitry, interfaces, and/or code that may be operable to receive incoming satellite signals, and transform them into signals that may be further processed within the home network 100, such as via the home gateway 102, to enable extraction of multimedia content carried thereby.

The home network 100 may correspond to a location that may comprise a plurality of devices which may be serviced and/or managed by the home gateway 102. In this regard, the location may be a residence (e.g. home or apartment), a small business, a school, a library, and/or other like settings in which users may want to obtain access to service and/or content provider networks. The home gateway 102 may be utilized in the home network 102 to provide connectivity between the home network 100 and the services providers 120 and/or the content providers 130, via the delivery networks 110.

The home gateway 102 may comprise suitable logic, circuitry, interfaces, and/or code that may be operable to implement various aspects of the invention. In this regard, the home gateway 102 may be operable to communicate with the content providers 130, the service headends 120, and the local client devices 104. In this manner, the home gateway 102 may enable bidirectional communication of content and/or other information between the content providers 130, the service headends 120 and the client devices 104. The home gateway 102 may function and/or be configured as a cable/satellite set-top box (STB), a broadband gateway, and/or an Internet Protocol Television (IPTV) gateway. Communications between the home gateway 102 and the content providers 130 and/or service headends 120 may be carried over optical, wired, and/or wireless links of the delivery networks 110. The home gateway 102 may be operable to handle multiple physical layer connections to multiple ones, or portions, of the delivery networks 110, where different ones or portions of the delivery networks 110 are owned, operated, leased, or otherwise associated with different ones of the network access service headends 120. In some instances, the home gateway 102 may be operable to concurrently communicate over the multiple physical layer connections provided by the multiple network access service providers. For example, the home gateway 102 may be operable to configure and/or utilize one or more connections 108 to the delivery networks 110. The connections 108 may comprise wired and/or wireless connections between the home gateway 102 and the delivery networks 110, which may enable communication between the home gateway 102 and the service headends 120.

The home gateway 102 may operate as an interface device that may allow one or more service and/or content providers to interact with various devices in the home network. In this regard, the home gateway 102 may enable delivering multimedia content to the home network 100 through one or more services providers 120. For example, the home gateway 102 may be operable to perform such operations as network access processing comprising PHY/MAC, and/or transport layer processing, as well as encryption and/or decryption, user and/or device authentication, and/or video and/or audio processing, to facilitate communication and/or consumption of multimedia content.

In some embodiments of the invention, the home gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. While the home gateway 102 is shown in FIG. 1 as a single and separate device, the invention need not be so limited. In one embodiment of the invention, the home gateway functionality may be implemented in a distributed manner over two or more devices. Furthermore, the home gateway may be implemented as a virtual platform, for example in instances where it may be implemented in distributed manner. In another embodiment of the invention, some or all of the functionality of the home gateway may be implemented within one of the televisions available in the home.

The home gateway 102 may service a plurality of client devices, which may comprise local client device 104 and one or more remote client device 140. The client devices may comprise personal and/or household devices that may be operable to interact with, and/or be communicatively coupled to the home gateway 102. In this regard, the local client devices 104 and/or the remote client devices 140 may comprise content consuming devices. Exemplary client devices may comprise, for example, televisions, computers (desktops or laptops), smartphones, tablets, digital video recorder (DVR), and/or personal video recorder (PVR). Communications between the home gateway 102 and the client devices may be carried over optical, wired, and/or wireless links. The home gateway 102 may interact with the local client devices 104 via links 106, each of which may be supported by the home gateway 102 and the corresponding client device. Exemplary links 106 may comprise High-Definition Multimedia Interface (HDMI) cables, 60 GHz WiGig wireless connections, wired Ethernet connections, WiFi connections, multimedia over coax alliance (MoCA), and/or HomePNA connections. The home gateway 102 may interact with the remote client devices 140 indirectly, such as via the delivery networks 110. For example, communication between the gateway 102 and the remote client devices 140 may be performed as IP interactions via the Internet 110A.

In operation, the home gateway 102 may be utilized as an interface device to allow one or more service headends 120 and/or content providers 130 to interact with various devices in a home network, such as in the home network 100. In this regard, the home gateway 102 may be operable to perform and/or provide various services that may enable communication of content from one or more content providers, wherein the content may be delivered through one or more services providers. The home gateway 102 may distribute the received content to one or more client devices 104 in the home network 100, for consumption. Content may be delivered to the home network 100 via, and/or may be received by the home gateway 102 from the delivery networks 110. In this regard, content delivery may comprise use of traditional content delivery services, comprising traditional terrestrial (over-the-air), cable, and/or satellite delivery services for example, which used in conjunction with such content sources as linear analog broadcasting source 130B, linear digital broadcasting source 130C, switched digital multicasting source 130D.

In this regard, for cable based delivery services, content may be obtained from appropriate content sources, and may be prepared via the content preparation server 120B, and may then be communicated by the headend delivery servers 120A via the cable network 110B. For cable delivery via traditional coax connections and/or via the HFC network 114, content delivery services may comprise Video-on-Demand (VOD) and Switched Digital Video (SDV). VOD services may comprise server-based delivery of MPEG transport streams (MPEG-TSs) via the headend delivery servers 120A of the service headend 120. SDV services involve centralized pre-processing of linear video streams into Constant bitrate (CBR) Single Program TSs (SPTSs). The SPTSs may then be routed to network encryption devices which may apply appropriate content security, and may multicast the streams onto the network. During such services, the home gateway 102 may function as cable STB, and may be operable to receive cable signals through Data Over Cable Service Interface Specification (DOCSIS) or legacy out-of-band based connections. In this regard, the home gateway 102 may receive native quadrature amplitude modulation (QAM) signals carrying MPEG-2 TSs with video/audio streams, and/or additional information such as command or control data.

During fiber based delivery, content may be acquired from linear analog broadcasting source 120B and/or linear digital broadcasting source 120C, and may be prepared and/or processed by the content preparation server 120B. The headend delivery servers 120A may then communicate the prepared content to subscribers via the PON network 112. Content may be delivered utilizing MPEG-TSs. In this regard, the ONU 108B may be utilized to terminate PON traffic, which may then be processed, by the ONU 108B and/or the home gateway 102, to convert received signals, or information extracted therefrom, back to their transmission formats, for example MPEG-2 TSs or ASF with video/audio streams. For satellite content delivery services, via the satellite network 110C, service headends 120 may broadcast digital video and audio in the form of MPEG-TS directly to subscribers via the satellite network 110C. The satellite signals carrying the MPEG-TS may be received via the satellite receive 108A, and may then be forwarded to the home gateway 102 for extraction of content. During such services, the home gateway 102 may function as a satellite STB, and may be operable to receive and/or process quadrature phase-shift keying (QPSK) or 8-phase-shift keying (8PSK) modulation based satellite signals, to extract MPEG-2 TSs with video/audio streams carried therein.

The service headends 130 may also support IP streaming of content, or IP video services (also called IP television or IPTV services). Such services may be limited to specialized content sources specifically enabling and/or allowing for communication of content using data traffic via IP networks. The content received from such sources may be prepared via the content preparation server 120B, and may then be communicated via the IP streaming servers 120C via appropriate IP capable networks. These networks may be carrier-grade IP networks with QoS and/or the Internet 110A. During such services, the home gateway 102 may function as IPTV gateway, and may be operable to receive content delivered via IP protocol based packets configured for ingestion by IPTV gateways. In this regard, the home gateway 102 may embed and/or provide Cable Modem and/or DSL modem based functions to enable termination and/or handling of IP based connections.

In various embodiments of the invention, at least some of the content handling and/or processing operations, which may typically be performed by the service headends 130 during content delivery, may be moved instead to the home gateways 102. For example, during IP content streaming operations, at least some of the content preparation and/or presentation related operations that may otherwise be performed by the content preparation server 120B are instead performed by the home gateway 102. Offloading handling of at least a portion of content processing for presentation into the home gateway 102 may enhance operations and/or efficiency in the communication model described in FIG. 1. In this regard, performing content preparation in the service headends 130 may require preparing and/or formatting of particular content to support presentation in all client or consumption devices that may potentially be available in the market. In other words, during processing of the particular content, that content may be processed multiple times to generate specifically-formatted versions each of which suitable for certain client device(s). For example, the same content may be formatted differently during IP streaming for consumption by an Apple tablet, Android based smartphone, a MS-Windows based laptop, or a high-definition television (HDTV).

Furthermore, the service headends 130 may be required to push into the delivery networks 100, typically concurrently, all such specifically-formatted versions of the content. In reality, however, in each home network, only a subset of commercially available client devices may exist and/or be utilized at any given time. Therefore, each home network 100 may only require a subset of the various specifically-formatted versions of the content. Accordingly, communicating all various specifically-formatted versions of a particular content may lead to unnecessary processing by the service headends 130 and/or unnecessary use of bandwidth within the delivery networks 100, especially the Internet 110A. Thus, to reduce processing load in the service headends 130 and/or bandwidth use in the Internet 110A, the content may simply be distributed, without being processed by the service headends 130 based on any particular formatting, to the home gateways 102. The home gateways 102 may then process the distributed content to generate any required specifically-formatted content based on knowledge of the client devices that are being serviced by particular gateways.

Figure 2:
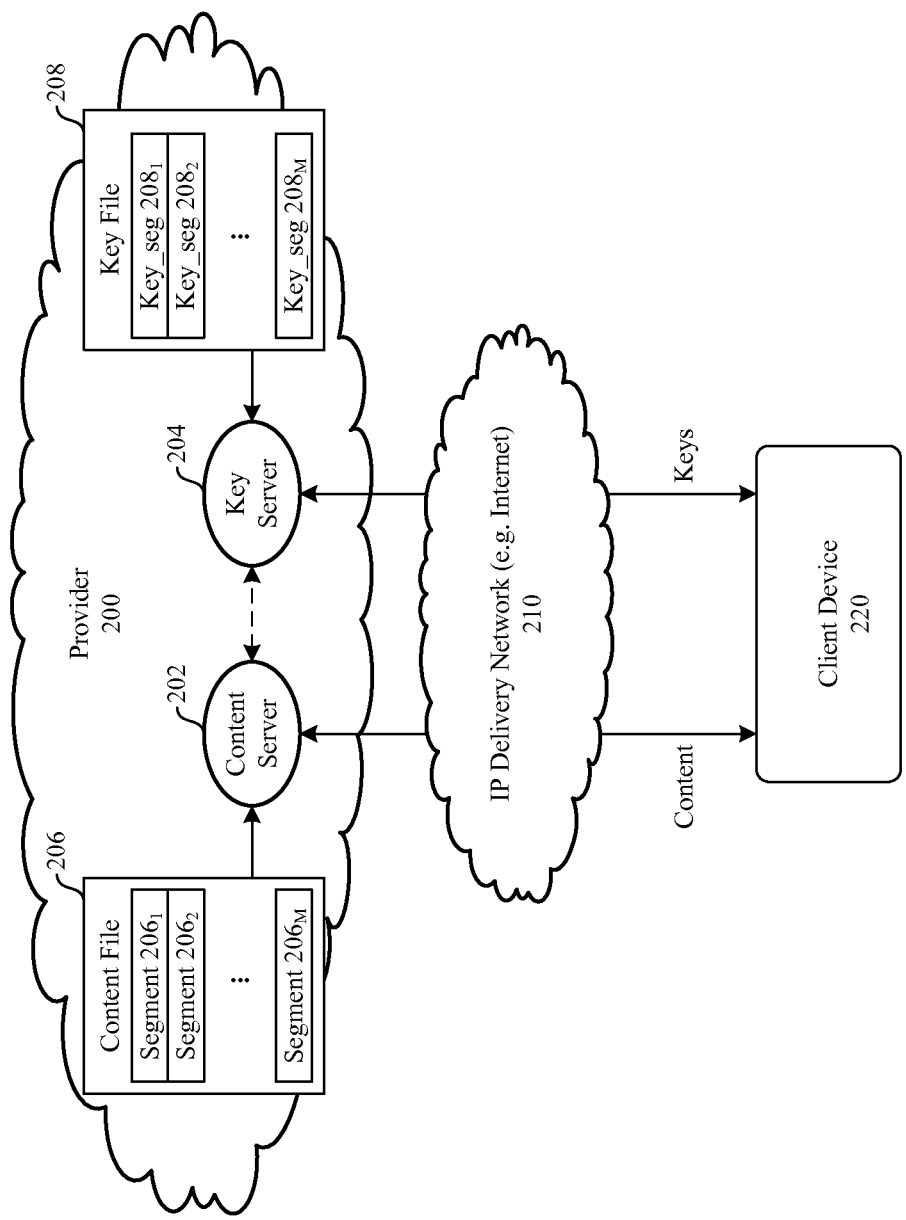
FIG. 2 is a block diagram illustrating an exemplary communication system for delivering content, via IP streaming, in protected manner, in accordance with an embodiment of the invention.

FIG. 2 is a block diagram illustrating an exemplary communication system for delivering content, via IP streaming, in protected manner, in accordance with an embodiment of the invention. Referring to FIG. 2, there is shown a provider 200, an IP delivery network 210, and a client device 220.

The provider 200 may be operable to support IP streaming of content to a plurality of client devices, such as the client device 200. The provider 200 may correspond to various IP streaming related components and/or functions of the service headends 120 and/or content providers 130 of FIG. 1. The provider 200 may comprise a content server 202 and key server 204. The content server 202 may comprise suitable logic, circuitry, interfaces, and/or code that may be operable to process and/or configure content for delivery to client devices. In this regard, processing content by the content server 202 may incorporate various techniques for protecting the delivered content against unwanted access. For example, content protection may comprise segmenting content into a plurality of segments, each of which may be accessible by a unique key.

The key server 204 may comprise suitable logic, circuitry, interfaces, and/or code that may be operable to provide key control and/or management related functions to support delivery of content in protected manner. In this regard, the key server 204 may support, in conjunction with the content server 202, segmentation based content protection, for example by generating and/or providing required segment keys, and/or configuring delivery and/or use thereof.

In operation, the provider 200 may provide IP streaming of content to client devices, such as the client device 200 in a protected manner. In this regard, content protection may comprise segmenting content into a plurality of separately encrypted segments, each of which may be accessible by a corresponding unique key. For example, a particular content 206 may be segmented, via the content server 202, into a plurality of content segments $206_1$-$206_M$. The key server 204 may generate a corresponding plurality of segment keys $208_1$-$208_M$, each of which may be utilized in encrypting a corresponding one of the content segments $206_1$-$206_M$. For example, segment key $208_1$ is utilized in encrypting content segment $206_1$; segment key $208_2$ is utilized in encrypting content segment $206_2$, and so forth. In this regard, the content server 202 and/or 204 may interact to coordinate and/or synchronize generation of the plurality of content segments $206_1$-$206_M$ and the corresponding plurality of segment keys $208_1$-$208_M$.

The segment keys $208_1$-$208_M$ may also be utilized during content consumption and/or presentation, such as by client devices, in decrypting the encrypted content segments. For example, during a protected IP delivery of content 206, the client device 220 may request content 206 from the content server 202. The request may be communicated via the Internet 210, and may comprise information pertaining to the client device 200 and/or users associated therewith. The content server 202 may check the credentials of the client device 220 and/or the user(s), and may respond with information pertaining to the presentation description of the content. This information may comprise access to related information, such as URLs, associated with content segments $206_1$-$206_M$ and their corresponding segment keys $208_1$-$208_M$, which the client device 220 may utilize to obtain these segments and/or keys. The client device 220 may then execute streaming service based on the presentation description, starts. In this regard, during procedure of executing the presentation description may comprise obtaining the content segments $206_1$-$206_M$. The procedure may also comprise communicating and/or synchronization with key the server 204, to obtain corresponding segment keys $208_1$-$208_M$. Accordingly, the client device 220 may utilize each of the segment keys $208_1$-$208_M$ in decrypting corresponding one of the content segments $206_1$-$206_M$, and the decrypted segments may then be consumed in the client device 220. In this regard, the content segments $206_1$-$206_M$ may be presented in sequence, as they are being decrypted, and/or the client device may assemble the segments first, to recreate content 206 in whole first, before content presentation.

Figure 3A:
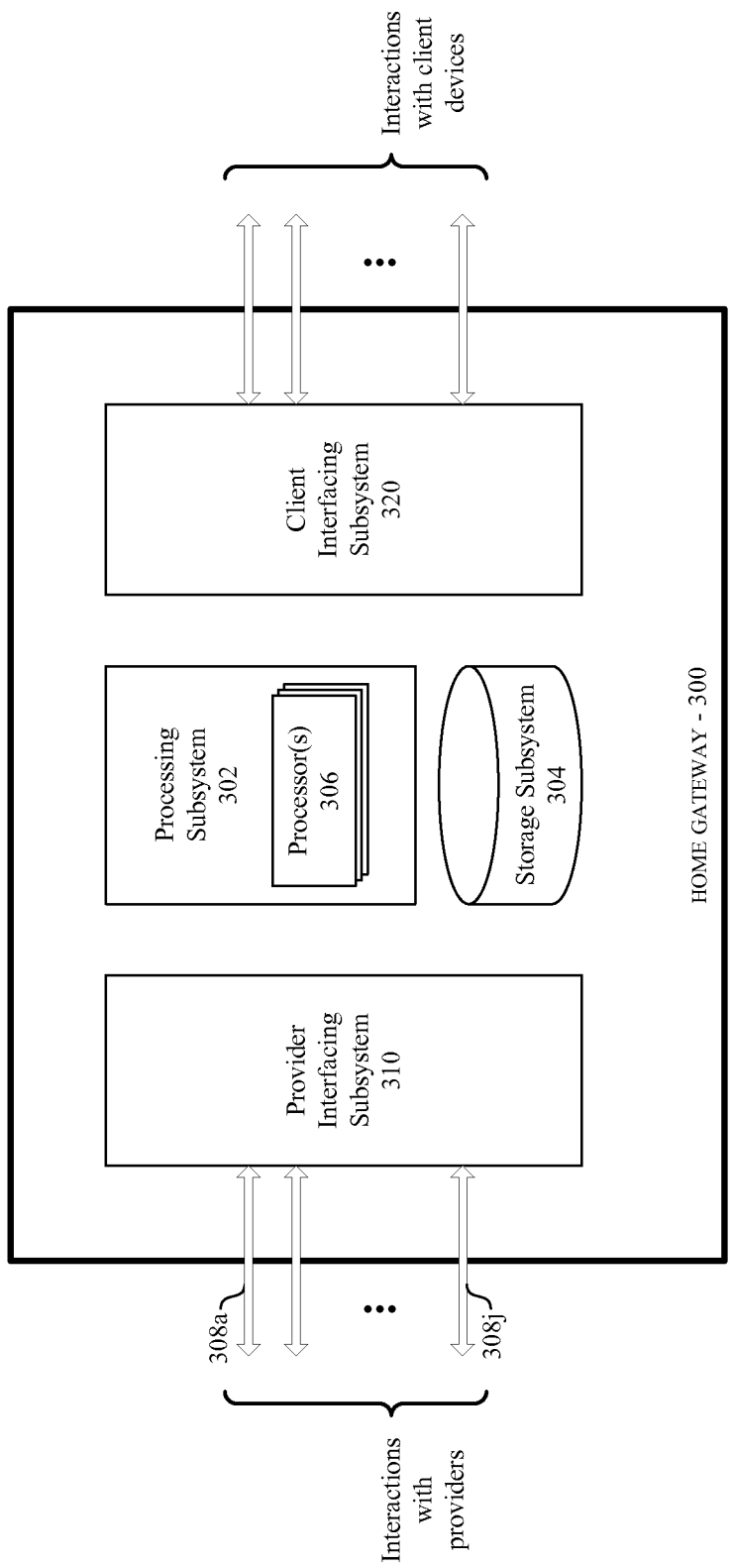
FIG. 3A is a block diagram illustrating an exemplary home gateway that may enable unified video delivery for supporting IP video streaming service, in accordance with an embodiment of the invention.

FIG. 3A is a block diagram illustrating an exemplary home gateway that may enable unified video delivery for supporting IP video streaming service, in accordance with an embodiment of the invention. Referring to FIG. 3A, there is shown a home gateway 300, which may correspond to the home gateway 102 of FIG. 1.

The home gateway 300 may comprise multiple hardware and/or software modules and/or subsystems, such as, for example, a processing subsystem 302, a storage subsystem 304, a provider interfacing subsystem 310, and a client interfacing subsystem 320. In some instances, the home gateway 300 may be such that the various modules listed above may be distributed over multiple devices. Moreover, the modules listed above are provided by way of illustration and not of limitation. Other configurations and/or architectures of the home gateway 300 may be implemented.

The processing subsystem 302 may comprise suitable logic, circuitry, interfaces, and/or code that may be operable to perform control and/or data processing operations in the home gateway 300. The processing subsystem 302 may process data received from the service and/or content providers and/or data received from one or more devices in a home network serviced by the gateway 300. In this regard, the processing subsystem 302 may comprise one or more portions that may be operable to handle certain types of data such as video data and/or audio data, for example. The processing subsystem 302 may also be operable to control and/or manage operations of the home gateway 300, and/or performing tasks and/or applications therein. For example, the processing subsystem 302 may enable execution of applications, programs and/or code which may be stored in the storage subsystem 304, for example. In this regard, the processing subsystem 302 may be operable to configure and/or control operations of various components and/or subsystems of the home gateway 300, and/or other devices managed by and/or connected to the home gateway 300, by utilizing, for example, one or more control signals. The processing subsystem 302 may also control data transfers within the home gateway 300, in the course of performing various applications and/or tasks for example.

The processing subsystem 302 may comprise, for example, one or more processors 306, which comprise general processors, such as one or more CPUs, and/or specialized processors, such as one or more dedicated video and/or audio processors. The processor 306 may also comprise one or more secure processor for providing security related operations. While the processing subsystem 302 is shown herein as a single block, the invention needs not be so limited. Accordingly, in instances where the home gateway 300 is implemented a distributed platform, some of the operations and/or functions described herein with regard to the processing subsystems may be performed by different components that may be located in different devices.

The storage subsystem 304 may comprise suitable logic, circuitry, interfaces, and/or code that may be operable to store data utilized in the operations of the home gateway 300. In this regard, the storage subsystem 304 may comprise one or more memory devices that may enable permanent and/or non-permanent storage, buffering, and/or fetching of data, code and/or other information which may be used, consumed, and/or handled in the home gateway 300. For example, the storage subsystem 304 may be utilized to store configuration data, parameters, device information, tracking and/or monitoring information, security information, and intermediate processing data, for example. The storage subsystem 304 may comprise storage media integrated in the home gateway 300 and/or one or more removable storage devices. In this regard, the storage subsystem 304 may comprise different memory technologies, including, for example, read-only memory (ROM), random access memory (RAM), Flash memory, solid-state drives (SSDs), and/or field-programmable gate arrays (FPGAs).

The provider interfacing subsystem 310 may comprise suitable logic, circuitry, interfaces, and/or code that may be operable to communicate data, via one or more physical layer connections 308a-308j, to one or more corresponding network access service providers, via the delivery networks 110, for example. The provider interfacing subsystem 310 may be operable to support multiple communication protocols, standards, and/or data transport technologies. In this regard, each of the physical layer connections 308a-308j may connect the gateway 102 to different network access service provider, and may comprise a wired, optical, or wireless connection. Each of the physical layer connections 308a-308j may utilize different physical media and/or different physical layer protocols. For example, the connection 308a may comprise a DSL over twisted-pair connection whereas and the connection 308j may comprise a CATV over coaxial cable connection. Accordingly, the provider interfacing subsystem 310 may enable accessing and/or communicating with one or more service headends 120 and/or content providers 130, via the delivery networks 110. The provider interfacing subsystem 310 may also be utilized to communicate data to and/or from third parties. In this regard, the provider interfacing subsystem 310 may enable gateway-to-gateway communication and/or interactions between the home gateway 300 and communication devices located outside the home network 100, directly and/or indirectly through distribution networks corresponding to one or more service providers. The provider interfacing subsystem 310 may enable concurrently communicating with multiple and/or different service/content providers and/or devices.

The client interfacing subsystem 320 may comprise suitable logic, circuitry, interfaces, and/or code that may be operable to communicate with one or more client devices in a home network serviced and/or managed by the home gateway 300, such as the home network 100 of FIG. 1. In this regard, the client interfacing subsystem 320 may enable exchanging data and/or messages with the client devices. The client interfacing subsystem 320 may be operable to support multiple communication protocols, standards, and/or data transport technologies. For example, the client interfacing subsystem 320 may support the links 106a-106j, substantially as describe with regard to FIG. 1.

In operation, the home gateway 300 may be utilized as an interface device that provides connectivity between service and/or content providers and devices in a home network, such as the home network 100. In this regard, the home gateway 300 may enable and/or facilitate communication of content, such as multimedia content, from one or more content providers. The content may be delivered through one or more services providers. For example, the home gateway may communicate with one or more service headends 120 via the provider interfacing subsystem 310, to facilitate transmitting requests to, and/or receiving content from the service headends 130, via one or more of the delivery networks 110. The home gateway 300 may also be operable to communicate with a plurality of client devices in a home network, such as the client devices 104 in the home network 100, using the client interfacing subsystem 320. In this regard, the client interfacing subsystem 320 may support use of one or more of the links 106. Accordingly, the home gateway 300 may be operable to distribute the received content to one or more home devices, for content consumption, and/or may perform, directly via the processing subsystem 302 and/or indirectly using other devices, any processing and/or functions comprising, for example decryption and/or account validation, which that may be necessary to ensure that the content may be consumed by one or more of the target home devices.

In various embodiments of the invention, the home gateway 300 may be operable to handle at least a portion of content processing corresponding to content being obtained for and/or consumed by one or more client devices serviced by the home gateway 300. In this regard, the content may be obtained from content providers 130 without being processed for specific formatting suitable for requesting client device. The content may be received via Internet 110A utilizing interfacing subsystem 310. The content may then be processed, utilizing processing subsystem 302, for presentation based on specific formatting parameters and/or standards suitable for the requesting client device. The processed content may then be communicated to the requesting client device via the client interfacing subsystem 320.

In an exemplary embodiment of the invention, the home gateway 300 may be configured to utilize and/or support use of, by client devices, a single application (app) for accessing content/service providers and/or presenting requested content obtained therefrom. In this regard, with IP streaming of content for example, various applications (apps) may be utilized in obtaining and/or presenting particular content at the client devices, necessitating generating and/or configuring a corresponding plurality of specifically formatted versions of the content. These apps may be specific to particular media access. These applications (app) may correspond to and/or be specific to various and/or particular media sources, such as Web, cable TV, and/or IPTV based service and/or content providers. For example, for smartphones and/or tablet devices, exemplary content presentation applications may comprise an ABC app, a NBC app, and/or a YouTube app. Thus, for a particular content, various versions may be generated and/or configured that may each be specifically formatted and/or suited for presentation via each of the ABC app, NBC app, and/or the YouTube app. Furthermore, each of these apps would have to be downloaded into the client devices, and/or must be supported or utilized therein during presentation of content that is obtained from corresponding content/service provider(s).

Instead, the home gateway 300 may implement a single application that is utilized by all client devices, and only that single application would need to be downloaded into the client devices. Accordingly, all interactions between the home gateway 300 and the client device and/or any operations performed by the client device in conjunction with content presentation would be based on only that single app. The utilized single app may be selected from commercially available apps, or may comprise a proprietary app that is designed for and/or utilized only within home networks. The home gateway 300 may be operable to convert received content that is formatted for other apps into format suitable for the single app utilized in content related interactions and/or operations by the home gateway 300 and/or the client devices. Furthermore, in some instances, the home gateway 300 may be operable to obtain various portions of requested content from various content/service provider, with these portions being formatted for different apps, may combine and/or multiplex these portions during content presentation operations, wherein the home gateway 300 may repackage the various received portions, as a single content file for example, after converting each of these received portions into format associated with the single app utilized by the home gateway 300 and the client device for example.

In an exemplary embodiment of the invention, the home gateway 300 may provide user interface services in the home network. In this regard, the home gateway 300 may be operable to support user interfaces, and/or to generate and/or store data corresponding thereto, which may be utilized to enable interactions between the home gateway 300 and client devices serviced by the home gateway 300, or users thereof. Exemplary user interfaces may comprise graphic user interfaces (GUIs), which may enable visual display and/or interactions. Information inputted and/or outputted using the user interfaces may be stored in the home gateway 300, via the storage subsystem 204 for example. The user interfaces may enable configuring the home gateway 300, the client devices, and/or any applications and/or services provided via the home gateway 300. GUIs, and like interfaces, may be displayed using one or more devices coupled to the home gateway 300. For example, the user interface may be utilized to enable specifying and/or authorizing use of the single app in conjunction with content presentation, and/or to enable downloading the app into client devices and/or configuring the client devices to utilize the app. The user interface may support content search operations. In this regard, the user interface may enable displaying available content, requesting particular content, and/or specifying particular content/servicer providers from whom the content, or portions thereof, may be obtained.

Figure 3B:
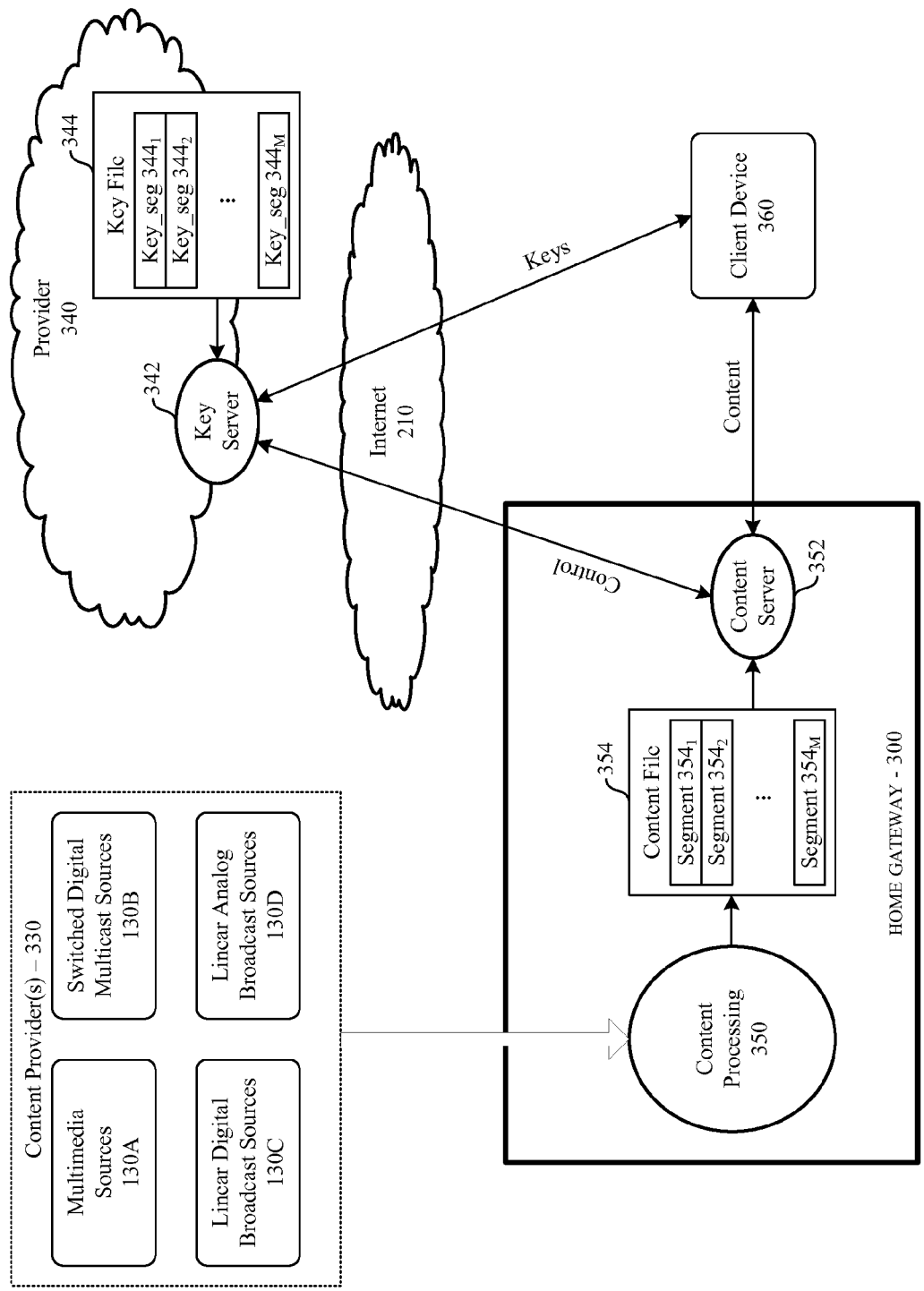
FIG. 3B is a block diagram illustrating use of an exemplary home gateway for unified video delivery in support of IP video streaming servicing, in accordance with an embodiment of the invention.

FIG. 3B is a block diagram illustrating use of an exemplary home gateway for unified video delivery in support of IP video streaming servicing, in accordance with an embodiment of the invention. Referring to FIG. 3B, there is shown the home gateway 300 of FIG. 3A. Also shown in FIG. 3B is plurality of content providers 330, a provider 340, and a client device 360.

The provider 340 may be similar to the provider 200 of FIG. 2. In this regard, the provider 340 may support IP content streaming to a plurality of client devices. In an exemplary aspect of the invention, the provider 340 may be operable to support use of home gateways to provide a unified approach for IP content stream services. In this regard, the provider 340 may ensure protected access for content delivered via home gateways during unified IP content streaming services. For example, content protection may comprise use of segmentation based access control techniques, which may comprise segmenting delivered content into a plurality of segments, each of which being accessible by a unique key. In this regard, the provider 340 may comprise a key server 342, which may be substantially similar to key server 204 of FIG. 2. The key server 342 may be operable to support protecting access of content delivered via home gateway 300 during unified IP content streaming services.

The content providers 330 may be similar to content providers 130, substantially as described with regard to FIG. 1. In this regard, the content providers 330 may comprise various content sources corresponding to various content distribution schemes. In this regard, exemplary content distribution sources may comprise multimedia content sources 330A, linear analog broadcast sources 330B, linear digital broadcast sources 330C, and/or switched digital multicast sources 330D.

In operation, the home gateway 300 may provide and/or support unified IP content stream services. In this regard, the unified IP content stream service may comprise supporting a plurality IP streaming protocols and/or formats. For example, a plurality IP streaming protocols and/or formats may comprise MPEG dynamic adaptive streaming over HTTP (DASH), HTTP live streaming (HLS), and/or Internet Information Services (IIS) Smooth Streaming. During unified IP content streaming system, in response to request for particular content, the content providers 330 may deliver legacy content data, such as MPEG-2 transport streams (TSs), to the home gateway 300. The home gateway 300 may utilize the processing subsystem 302 to provide content processing 350 of the delivered content, in order to prepare the content for use by a particular client device. In this regard, the content may be specifically formatted for presentation by the client device.

A content server 352 may run and/or execute within the home gateway 300 during unified IP content streaming services. The content server 352 may be similar to the content server 202, substantially as described with regard to FIG. 2. In this regard, the content server 352 may be operable to manage and/or control interactions with client devices requesting content via the home gateway 300, and/or to manage and/or control content processing 350 to properly prepare delivered content for consumption by requesting client or consuming devices. For example, the home gateway 300 may be operable to implement, via the processing subsystem 302 for example, functions associate with the content server 352, which may be utilized during IP content streaming services. In this regard, the home gateway 300 may perform various functions and/or operations during content processing 350. The content processing 350 may comprise, for example, content transcoding, which may enable converting the content from legacy data format to an IP streaming format. Content processing 350 may also comprise performing protected access related operations and/or functions. In this regard, the home gateway 300 may be operable to perform transcypting on delivered content, to enable changing and/or modifying the encryption of a digital media file. For example, the segmentation based protected access techniques may enable the home gateway 300 to generate a plurality of encrypted segments, which may require user of different keys for decrypting the encrypted segments.

For example, the client device 360 may send a request for a particular content to the home gateway 300. The client device 360 may also communicate information pertaining to capabilities of and/or features available in the client device 360, which may be pertinent to presentation and/or use of the requested content. For example, the information may identify a type of the client device, a type and/or version of software utilized in conjunction with presenting the content, and/or capabilities of display to be utilized in playing video. The home gateway 300 may perform various authentication operations before proceeding with obtaining and/or delivering the requested content. In this regard, the home gateway 300 may authenticate credentials of the client device 360, and/or users thereof. After successful verification of credentials, the home gateway 300 may search the content providers 330 for the best source for the requested content during servicing of the client device 360. In this regard, the home gateway 300 may determine the best source based on such criteria as quality, cost, and/or time.

The content may then be delivered to the home gateway 300, wherein the delivered content may comprise legacy format utilized during traditional content delivery operations. The home gateway 300 may then perform content processing 350 on the delivered content, which may comprise performing transcoding to format the delivered content appropriately for use by the client device 360. The home gateway 300 may covert the delivered content to a format suitable for use by Apple based devices in instances where the home gateway 300 may determine that the client device 360 may comprise an Apple iPad tablet, for example.

The home gateway 300 may also perform, during content processing 350, various secure access related operations, such as transcypting, which may comprise generating encrypted segments of the content. For example, in segmentation based protected access operations, the home gateway 300 may be operable process delivered legacy content to generate, based on content processing 350, corresponding formatted content 354. The content 354 may then be segmented into a plurality of content segments $354_1$-$354_M$. In this regard, each of content segments $354_1$-$354_M$ may be encrypted, and subsequently decrypted using a unique and/or different segment key. For example, each of plurality of segment keys $344_1$-$344_M$ may be utilized or encryption, and subsequently decryption of a corresponding one of the content segments $354_1$-$354_M$. The plurality of segment keys $344_1$-$344_M$ may be generated by the key server 342 of the provider 340. In this regard, the content server 352 of the home gateway 300 may interact with the key server 342, to coordinate and/or synchronize generation of the plurality of segment keys $344_1$-$344_M$, and to enable retrieval of the keys for use during segment encryption and/or to provide them to the client device 360 for use during segment decryption operations performed there. Alternatively, the home gateway 300 may be operable to perform the key generation, under the control and/or direction of the key server 342 of the provider 340. In this regard, the home gateway 300 may be operable to securely generate a plurality of segment keys $344_1$-$344_M$, utilizing a secure processor in the processing subsystem 302 for example. Furthermore, the plurality of segment keys $344_1$-$344_M$ may be encrypted by the public key of the key server 342 and sent to the key server 342, to enable the key server 342 to provide the keys to remote client devices for example.

Once protected access operations are performed and/or synchronized with the key server 342, the home gateway 300 may utilize the content server 352 to generate and communicate with the client device 360 a media presentation description file, which may comprise information that may enable the client device 360 to obtain the plurality of content segments $354_1$-$354_M$ and/or the corresponding plurality of segment keys $344_1$-$344_M$. In this regard, the media presentation description may comprise information pertaining to URLs corresponding to content server 352 and key server 342. The client device 360 may utilize the media presentation description to initiate content presentation. In this regard, the procedure for executing the media presentation description may comprise interaction and synchronization with the key server 342 and/or content server 352 to enable key extraction and/or retrieval, obtaining segments from the content server 352, and/or use of the keys for decrypting the content segments.

In an embodiment of the invention, the home gateway 300 may generate and/or maintain a client device database for use in conjunction with IP content streaming services. In this regard, the client device database may comprise a plurality of entries each corresponding to one of local or remote client devices serviced by the home gateway 300. Each of the entries of the client device database may comprise information associated with corresponding client device and/or capabilities or features thereof, which may be relevant to IP content streaming services. The home gateway 300 may dynamically and/or continuously update the client device database. For example, the home gateway 300 may scan a home network serviced by the home gateway 300 to find client devices present therein. The home gateway 300 may also search for and/or interact with remote client devices outside the home network, accessible via the delivery networks 110, which may be associated with users of the home gateway 300. The home gateway 300 may determine relevant information associated each detected client device. Exemplary device information may comprise data pertaining type of device, capabilities and/or features available or supported by the devices, network access characteristics, and/or appropriate formats supported thereby.

The home gateway 300 may also prepare, based on the determined device information, configurations that may be suitable for the client device. In this regard, the configuration may pertain to various functions that may be required during IP content streaming services, such as transcoding, transcypting, and/or presentation required features. For example, presentation required features may comprise a particular player that may be necessary to consume particular types of content. Furthermore, the configuration may specify a need to download such players prior to and/or during servicing of corresponding client devices. For example, if needed, the home gateway 300 may download a new player download into the client device. The configuration information may be incorporated into entries corresponding to the client devices within the client device database. When a client device makes a service request to the home gateway 300, the home gateway 300 may check the client device database to determine if the client or consuming device database comprises an entry associated with the client device. If the client device has entry in the client device database, that entry may be accessed and/or utilized during servicing that client device. If the client device has entry in the client device database, the home gateway 300 may add a new entry associated with client device into the client device database. The client device entry may be updated and/or modified based on changes that may be determined by the home gateway 300, such as during servicing of the client device for example.

Figures 4A, 4B:
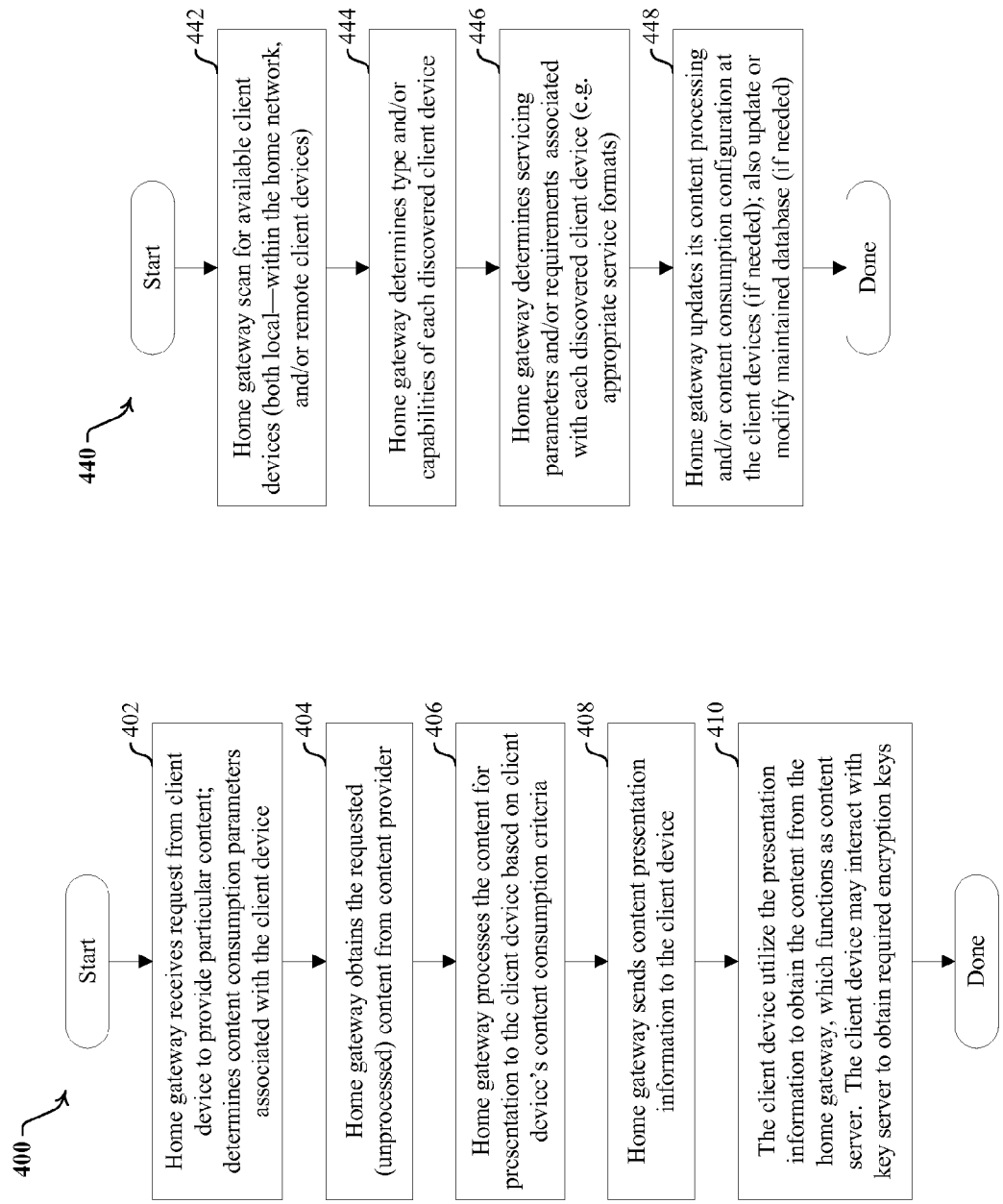
FIG. 4A is a flow chart that illustrates exemplary steps for handling content request by a home gateway that supports unified IP content streaming servicing, in accordance with an embodiment of the invention.
FIG. 4B is a flow chart that illustrates exemplary steps for generating client content servicing information by a home gateway that supports unified IP content streaming servicing, in accordance with an embodiment of the invention.

FIG. 4A is a flow chart that illustrates exemplary steps for handling content request by a home gateway that supports unified IP content streaming servicing, in accordance with an embodiment of the invention. Referring to FIG. 4A, there is shown a flow chart 400 comprising a plurality of exemplary steps that may be performed by a home gateway within a home network to support unified IP content streaming services.

In step 402, a home gateway, such as the home gateway 300, may receive a request from a client device, such as client device 360, to provide particular content. The home gateway may determine content consumption parameters associated with the client device. In this regard, the client device may be a local client device, which may be located within a home network serviced by the home gateway, or a remote client device, which may be located outside the home network but be operated by a user associated with the home gateway. In step 404, the home gateway may obtain the requested content from content provider. In this regard, the content need not be formatted and/or prepared by the content provider specifically for the requesting client device. In step 406, the home gateway may process the delivered content for presentation by the client device, based on content consumption criteria associated with the client device. In this regard, the content consumption criteria may be determined dynamically and/or based on preconfigured client device database. In step 408, the home gateway may communicate the content presentation information to the client device. For example, the content presentation information may comprise relevant configuration parameters and/or data, and/or decryption related information, and/or access information pertaining to the components of the home gateway and/or external servers that may be required during presentation of the content. In step 410, the client device may utilize the presentation information to obtain the content from the home gateway, which functions as content server. The client device may also interact, based on the presentation information, with external entities, such as key server to obtain required encryption keys for example.

FIG. 4B is a flow chart that illustrates exemplary steps for generating client content servicing information by a home gateway that supports unified IP content streaming servicing, in accordance with an embodiment of the invention. Referring to FIG. 4B, there is shown a flow chart 440 comprising a plurality of exemplary steps that may be performed by a home gateway within a home network to generate client servicing information in support of unified IP content streaming services.

In step 442, the home gateway may scan for available client devices. In this regard, the home gateway may scan for local client devices, comprising devices located within a home network serviced by the home gateway, and for remote client devices, comprising devices located outside the home network but being operated by a user associated with the home gateway. In step 444, the home gateway may determine for each discovered client, device information associated with the client device itself, such as type and/or capabilities thereof. In step 446, the home gateway may determine servicing parameters and/or requirements associated with each discovered client device. This may comprise determining appropriate content presentation formats supported by the client devices. In step 448, the home gateway may update its content processing and/or content consumption configuration at the client devices. The information may also be utilized to modify and/or update any client device database that may be maintained in the home gateway. In this regard, information retrieved from the client device database may be utilized to control and/or adjust configuration of the home gateway and/or particular client devices during subsequent uses of the home gateway, such as during future servicing of corresponding client devices.

Various embodiments of the invention may comprise a method and system for unified video delivery system for supporting IP video streaming service. The home gateway 300 may be utilized to obtain content for consumption and/or presentation by one or more client devices serviced by the home gateway 300. The client devices may comprise local client device 104 and/or remote client device 140. The content may be delivered, via the provider interfacing subsystem 310, using Internet Protocol (IP) streams. The home gateway 300 may handle, via the processing subsystem 302, at least a portion of processing of content obtained for consumption by the client devices. In this regard, the home gateway 300 may receive, via the provider interfacing subsystem 310, a single copy of requested content, having a first format, and may convert the received content to one or more other formats suitable for presentation by the client devices, based on knowledge of the client devices.

The home gateway 300 may maintain during handling of content processing, secure and/or protected access of the content. In this regard, during protected access, after formatting delivered content for by particular client device(s) during the content processing 350, the home gateway 300 may partition the received and reformatted content 354 into the plurality of segments $354_1$-$354_M$, each of which may be encrypted separately using a unique key. The encrypted segments $354_1$-$354_M$ may then be forwarded to the client devices. During decryption operations in the client devices, the client devices may utilize the encryption keys $344_1$-$344_M$ associated with the encrypted segments $354_1$-$354_M$. The encryption keys $344_1$-$344_M$ may be obtained, by both the client devices and the home gateway 300, from the key server 342. Alternatively, the home gateway 300 may generate the encryption keys $344_1$-$344_M$. In this regard, the home gateway 300 may generate the encryption keys based on control information provided by the key server 342.

The home gateway 300 may determine content consumption related information associated with the requesting client devices. The content consumption related information may be determined dynamically and/or based on a client device database maintained by the home gateway 300. The content consumption related information may comprise information pertaining to device type, device capabilities and/or features available therein, and/or content presentation related functions in the client device. The content consumption related information may be utilized to configure operations or functions of the home gateway 300 and/or the requesting client device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for unified video delivery system for supporting IP video steaming service.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    scanning, by a home gateway, for available client devices;
    determining, by said home gateway, a device type for each client device discovered;
    receiving, by said home gateway, content having a first format using Internet Protocol (IP) streams;
    converting said received content to a second format suitable for presentation by at least one client device of said discovered client devices based on said device type;
    encrypting, by said home gateway, said converted content, using an encryption key received from an IP streaming service provider, to generate encrypted content;
    communicating, by said home gateway, presentation information to said at least one client device to cause said at least one client device to request delivery of said encrypted content from said home gateway and to obtain said encryption key from said provider; and
    communicating, by said home gateway, said encrypted content to said at least one client device in response to a request, from said client at least one device, generated based on said presentation information.

2. The method according to claim 1, wherein said encrypting comprises:
    partitioning said converted content into a plurality of encrypted segments, said encrypted content including said plurality of encrypted segments.

3. The method according to claim 2, wherein said encryption key includes a plurality of encryption key segments corresponding to said plurality of encrypted segments, said plurality of encryption key segments being configured to decrypt said plurality of encrypted segments.

4. The method according to claim 1, further comprising:
    configuring said at least one client device to utilize a single content presentation application, wherein said second format corresponds to said single content presentation application.

5. The method according to claim 1, further comprising:
    determining content consumption related information associated with said at least one client device.

6. The method according to claim 5, wherein said content consumption related information pertains to device type, capabilities, features, and/or content presentation related information.

7. The method according to claim 5, further comprising:
    configuring said home gateway and/or said at least one client device based on said content consumption related information.

8. The method according to claim 1, further comprising:
    maintaining a client device database by said home gateway for use during content related services via said home gateway.

9. A home gateway configured to scan for available client devices and determine a device type for each client device discovered, the home gateway comprising:
    a provider interface configured to receive content having a first format from an Internet Protocol (IP) streaming service provider using IP streams;
    a subsystem processor configured to:
    convert said received content to a second format suitable for presentation by at least one client device of said discovered client devices based on said device type; and
    encrypt said converted content, using an encryption key received from said IP streaming service provider, to generate encrypted content; and
    a client interface configured to:
    communicate presentation information to said at least one client device to cause said at least one client device to request delivery of said encrypted content to said at least one client device, and to obtain said encryption key from said IP streaming service provider; and
    communicate said encrypted content to said at least one client device in response to a request by said at least one client device generated based on said presentation information.

10. The home gateway according to claim 9, wherein said subsystem processor is further configured to partition said converted content into a plurality of encrypted segments, said encrypted content including said plurality of encrypted segments.

11. The home gateway according to claim 10, wherein said encryption key includes a plurality of encryption key segments corresponding to said plurality of encrypted segments, said plurality of encryption key segments being configured to decrypt said plurality of encrypted segments.

12. The home gateway according to claim 9, wherein said subsystem processor is further configured to configure said at least one client device to utilize a single content presentation application, and wherein said second format corresponds to said single content presentation application.

13. The home gateway according to claim 9, wherein said subsystem processor is further configured to determine content consumption related information associated with said at least one client device.

14. The home gateway according to claim 13, wherein said content consumption related information pertains to device type, capabilities, features, and/or content presentation related information.

15. The home gateway according to claim 13, wherein said subsystem processor is further configured to control said home gateway and/or said at least one client device based on said content consumption related information.

16. The home gateway according to claim 9, further comprising a storage device configured to maintain a client device database to store information associated with said at least one client device.

17. A system, comprising:
    an Internet Protocol (IP) streaming system configured to generate content;
    a key provider configured to generate an encryption key associated with the generated content;
    a gateway in communication with the IP streaming system and the key provider, the gateway being configured to:
    scan for available client devices;
    determine a device type for each client device discovered;
    convert received content from a first format to a second format suitable for presentation by at least one client device of said discovered client devices based on said device type;
    encrypt content from the IP streaming system based on an encryption key from the key provider to generate encrypted content; and
    generate presentation information; and
    said at least one client device in communication with the gateway and the key provider, said at least one client device configured to:
- generate a first request for the encrypted content and a second request for the encryption key based on the presentation information;
- communicate the first request and the second request to the gateway and the key provider, respectively;
- receive, in response to the first request, the encrypted content from the gateway;
- receive, in response to the second request, the encryption key from the key provider; and
- decrypt the encrypted content based on the encryption key.

18. The system according to claim 17, wherein the gateway is configured to partition the content into a plurality of encrypted segments, the encrypted content including the plurality of encrypted segments.

19. The system according to claim 18, wherein the encryption key includes a plurality of encryption key segments corresponding to the plurality of encrypted segments, said at least one client device being configured to decrypt the plurality of encrypted segments based on the plurality of encryption key segments.

* * * * *